United States Patent Office 3,716,638
Patented Feb. 13, 1973

3,716,638
6α-METHYL-19-NOR-PROGESTERONE AND A
PROCESS OF ITS MANUFACTURE
Georg Anner and Jaroslav Kalvoda, Basel, Switzerland, assignors to Ciba-Geigy Corporation, Ardsley, N.Y.
No Drawing. Filed Oct. 6, 1970, Ser. No. 78,581
Claims priority, application Switzerland, Oct. 10, 1969, 15,272/69
Int. Cl. A61k 17/00
U.S. Cl. 424—243
1 Claim

ABSTRACT OF THE DISCLOSURE

The present invention provides the new 3,20-dioxo-6α-methyl-17α-caproyloxy-19-nor-Δ⁴-pregnene.
It may be used as gestagen and for fertility control.

The present invention provides a new 6α-methyl-19-nor-progesterone of the formula

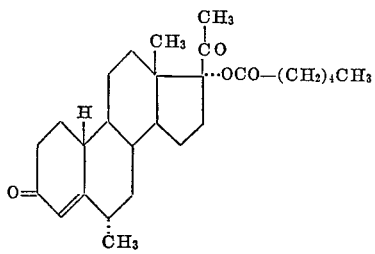

(I)

as well as a process for its manufacture, and pharmaceutical preparations containing the new compound.

The new compound possesses valuable pharmacological properties. Inter alia, it has more especially a high progestative and ovulation-inhibiting activity and can therefore be used above all as gestagen and for fertility control.

The high activity of the new compound can be demonstrated in animal tests; thus the 3,20-dioxo-6α-methyl-17α-caproyloxy-19-nor-Δ⁴-pregnene products, for example, in the Clauberg test on rabbits a complete progestative effect on a single subcutaneous administration of 0.1 to 1 mg./kg. The ovulation-inhibiting effect can be proved, for example, by way of the inhibition of the spontaneous ovulation of the rat, which materializes on subcutaneous administration of as little a dose as 0.003 to 0.03 mg./kg./day and on peroral administration of a dose from 0.01 to 0.3 mg./kg./day.

The new compound may be obtained in the known manner, when (1) in a compound of the general formula

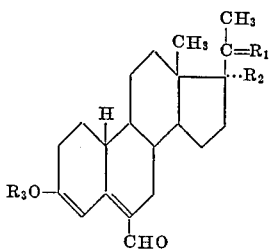

(II)

in which $R_1$ represents a free of ketalized oxo group, for example the ethylenedioxy group; $R_2$ represents a free or especially hydroxyl group esterified with capronic acid and $R_3$ represents a hydrocarbon residue, in the first place a lower alkyl group, or a carboxylic acid residue, especially a lower alkanoyl group, the aldehyde group is reduced to the methyl group; or (2) in a compound of the general formula

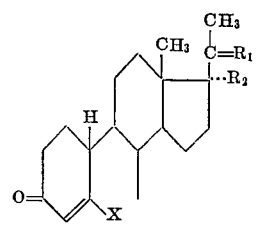

(III)

in which $R_1$ and $R_2$ have the meanings defined above and X stands for the grouping

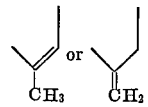

the double bond starting from the carbon atom in the 6-position is selectively reduced; or
(3) from a compound of the general formula

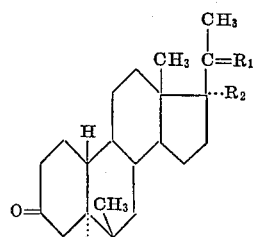

(IV)

in which $R_1$ and $R_2$ have the meanings defined above, water is eliminated; or
(4) in a compound of the general formula

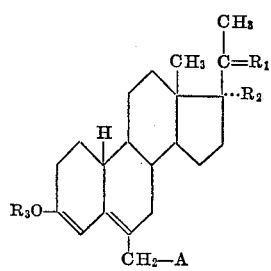

(V)

in which $R_1$, $R_2$ and $R_3$ have the meanings defined above and A represents a nitrogen atom linked with at least two radicals, the $CH_2$–A group is reduced to the methyl group, and any enol or ketal grouping present in a resulting compound is split to form the corresponding keto group, and/or a free 17-hydroxyl group possibly present in a resulting compound is caproylated, and the 6α-methyl compound is isolated from the resulting epimer mixture at any desired stage of the process, if desired after first having enriched the 6α-epimer.

As mentioned above, these reactions are carried out in the known manner. Thus, for reducing the aldehyde group in a compound of the Formula II, a palladium catalyst, for example palladium carbon, is preferably used, in the presence of a hydrogen donor, for example cyclohexene. When the reaction is carried out in this manner, the 3-enolether or 3-enolester grouping is split at the same time.

On the other hand, the double bond starting from the carbon atom in 6-position (see Formula III) is advantageously reduced with catalytically activated hydrogen, such as hydrogen in the presence of a palladium catalyst, for example palladium carbon or palladium carbonate.

The elimination of water from a compound of the Formula IV to form the double bond can be achieved with an inorganic or organic base, such as potassium tertiary butylate, potassium tertiary amylate, potassium carbonate, triethylamine or collidine, or with an inorganic acid, for example hydrochloric, sulphuric or perchloric acid, or with an organic acid such as acetic, propionic, oxalic or trifluoracetic acid. During this dehydration it is possible, for example, by treatment with a strong acid, to split an esterified hydroxyl group in the 17-position hydrolytically to the free hydroxyl group, or when the reaction is performed in a suitable organic, acidic medium, for example in an acid anhydride, especially in a mixed acid anhydried, a possibly present free 17-hydroxyl group can be esterified.

In a compound of the Formula V the symbol A represents a nitrogen atom linked to at least two radicals; preferably, it is a di-lower alkylamino, a lower alkylaralkylamino or an alkylene-amino group whose alkylene residue may be interrupted by oxygen, sulphur or a further nitrogen atom, being a pyrrolidino, piperidino, morpholino, thiomorpholino or piperazino group, or an acid addition salt thereof, a complex salt with boron or a quaternary ammonium derivative thereof. These amino and ammonium compounds can be reduced hydrogenolytically with hydrogen in the presence of a catalyst, for example Raney nickel, palladium or platinum or palladium carbon, in the presence of a hydrogen donor, such as cyclohexene or an alcohol.

An enol or ketal grouping possibly present in a resulting compound is hydrolyzed in the usual manner, for example with a (preferably inorganic) acid, such as hydrochloric, sulphuric or perchloric acid or a strong organic acid, for example trifluoracetic acid or sulphonic acid, for example para-toluene-sulphonic acid.

In a resulting compound the 17-hydroxyl group may be caprolyated, depending on the starting material used. When the acid residue does not correspond to the caproyl group, the esterified hydroxyl group is hydrolysed in the usual manner with an acid or preferably with a base, to form the free hydroxyl group. A free hydroxyl group present is then esterified in the usual manner with capronic acid or with a functional derivative thereof, such as its halides or anhydrides.

A resulting compound is generally a mixture of the $6\alpha$- and $6\beta$-epimers. This mixture is difficult to separate, but by treatment with an acid, which treatment, if desired, may be performed within the main or an additional process, the $6\alpha$-form can be enriched, and this enriched form is easier to isolate by chromatography and crystallization.

The above-mentoned reactions are carried out in the usual manner in a suitable solvent, with cooling or heating.

The invention includes also any variant of the present process in which an intermediate obtained at any stage of the process is used as starting material and any remaining step(s) is/are carried out, or a starting material is formed in situ or used in form of a salt or other derivative thereof.

The starting materials are known or, insofar as they are new, they can be prepared in the known manner; thus, for example, a compound of the Formula II is accessible from an enolester of a 3,20-diketo-17-$R_4$-$\Delta^4$-19-norpregnene by formulation with the Vilsmeier reagent, for example from phosphorus oxychloride, phosgene or thionylchlorate and dimethylformamide, for example in methylenechloride. When the intermediate from the Vilsmeier reaction is reduced directly, for example with sodium borohydride in pyridine, compounds of the Formula V are obtained.

The resulting 6-formyl-3-enolester or -ether can be reduced to the 6-hydroxymethylene compound which can be converted into the compound of the Formula III by treatment with an acid.

The compounds of the Formula IV can be prepared, for example, from corresponding 5,6-epoxy-6-desmethyl compounds by reaction with a methyl-Grignard compound.

The new compounds can be used as medicaments in the form of pharmaceutical preparations which contain the new active substances in conjunction or admixture with organic or inorganic, solid or liquid pharmaceutical excipients suitable for enteral, for example oral, or parenteral administration. Suitable excipients are substances that do not react with the new compounds, such as water, gelatin, lactose, starches, magnesium stearate, talcum, vegetable oils, benzyl alcohols, gum, polyalkyleneglycols, cholesterol or other known medicinal excipients. The pharmaceutical preparations may be, for example, tablets, dragees or capsules, or in liquid form solutions, suspensions (especially microsuspensions) or emulsions. They may be sterilized and/or contain adjuvants such as preserving, stabilizing, wetting or emulsifying agents, salts for regulating the osmotic pressure or buffers. They may also contain further therapeutically valuable substances.

The new preparations contain, for example for oral administration, advantageously in the form of tablets, dragees or capsules, preferably 1 to 100 mg., advantageously 5 to 50 mg., of the active substance per unit dose. The dose in which the new preparation is given depends on the requirements of the individual patient.

The preparations are manufactured in the way known for the formulation of medicaments.

The invention includes also the use of the said active substances or of the preparations containing these active substances as gestagens or for fertility control.

The following examples illustrate the invention.

EXAMPLE 1

2.0 grams of palladium carbon (10% Pd) are pasted with 4 ml. of glacial acetic acid; after about 5 minutes the whole is filtered, washed neutral with methanol, and transferred into the reaction vessel with about 10 ml. of methanol. Then 10.0 g. of 3-methoxy-6-formyl-17$\alpha$-caproyloxy-20-oxo-$\Delta^{3,5}$-19-nor-pregnadiene and 20 ml. of freshly distilled cyclohexene are added and the whole is stirred and refluxed for 18 hours. The reaction mixture is cooled to room temperature, filtered off the catalyst, mixed with 7.4 g. of magnesium silicate, refluxed for 15 minutes, once more cooled, diluted with ether, filtered and evaporated under a water-jet vacuum. The resulting crude product (9.1 g.) is dissolve in 100 ml. of toluene and chromatographed on 50 times its own weight of silica gel. From the first fractions 6$\alpha$-methyl-17$\alpha$-caprolyoxy-19-nor-progesterone is eluted with a 90:10-mixture of toluene and ethyl acetate. After several recrystallizations from methylenechloride+ether the compound melts at 113 to 115° C.

The formyl compound used as starting material is prepared, for example, thus: 13.0 grams of 17$\alpha$-caproyloxy-19-nor-progesterone are dissolved in 160 ml. of benzene; then about 25 ml. of solvent are distilled off, 6.5 ml. of freshly distilled o-formic acid methyl ester, 0.65 ml. of methanol and 130 mg. of p-toluene-sulphonic acid are added and the whole is stirred and refluxed for 2½ hours. Then, within 30 minutes, a further portion (10 ml.) of the solvent are distilled off, the mixture is cooled, mixed with 1.3 ml. of pyridine and diluted with ether, washed with saturated sodium hydrogencarbonate solution and then with water, dried and evaporated under a water-jet vacuum. Crystallization of the residue from methanol, in the presence of small quantities of pyridine, furnishes 3 - methoxy-17$\alpha$-caproyloxy-20-oxo-$\Delta^{3,5}$-19-norpregnadiene.

10.0 grams of this compound are dissolved in 25 ml. of methylenechloride and at 6° C. dropped into the Vilsmeier reagent prepared at 0° C. from 5.8 g. of dimethylformamide and 3 ml. of phosphorous oxychloride in 20 ml. of methylenechloride. The red solution is stirred for 2 hours at 0° C. and allowed to rise within 1 hour to 18° C., then once more cooled to about 5° C.; a suspension of 22 g. of anhydrous sodium acetate in 70 ml. of 90% methanol is added and the whole is stirred for 30 minutes at room temperature. The batch is then diluted with water and methylenechloride, the organic layer is washed successively twice with water, once with a potassium carbonate solution of 4% strength and once with water; then the washings are extracted with methylenechloride, dried and evaporated under a water-jet vacuum.

The resulting crude 3-methoxy-6-formyl-17α-caproyloxy - 20 - oxo-Δ$^{3,5}$-19-nor-pregnadiene (ultraviolet spectrum: λ$_{max}$.220=ϵ10,000 and 320=14,500) is reduced without first having been purified.

EXAMPLE 2

85 ml. of ethyl acetate are prehydrogenated in the presence of 100 mg. of a 5% palladium-calcium carbonate catalyst. After addition of 1.2 g. of 3,20-dioxo-6-methylene - 17α-caproyl-oxy-Δ$^4$-19-nor-pregnene, the mixture is hydrogenated at room temperature until 70 ml. (0° C./760 mm.) of hydrogen have been absorbed. The catalyst is subsequently filtered off, given a final wash with ethyl acetate and the filtrate evaporated under a water-jet vacuum. The pure 3,20-dioxo-6α-methyl-17α-caproyloxy-Δ$^4$-19-nor-pregnene, which melts at 113–115° C., is obtained from chromatography of the resulting crude product on silica gel and subsequent repeated recrystallisation from a methylene chloride-ether-petroleum ether mixture.

The 6-methylene compound that serves as starting material can be manufactured as follows:

From a suspension of 10 g. of 3,20-dioxo-17α-caproyloxy-Δ$^4$-19-nor-pregnene in 125 ml. of absolute benzene, approx. 15 ml. of solvent are distilled off within 10 minutes. 5.0 ml. of o-formic acid methyl ester, 0.5 ml. of methanol and 100 mg. of p-toluene sulphonic acid are added an the mixture refluxed for 3 hours. With 30 minutes a further 20 ml. of solvent are distilled off, the reaction mixture is cooled to approx. 20° C., 1.5 ml. of pyridine are added and the whole is distilled with ether and worked up in the usual way. Crystallisation of the crude product from an ether-petroleum ether mixture yields the pure 3-methoxy-17α-acetoxy-20-oxo-Δ$^{3,5}$-19-nor-pregnadiene. 4.64 g. of a solution of the above enol ether, cooled to 0° C., in 15 ml. of methylene chloride is added dropwise to a Vilsmeier compound, prepared at —8–0° C. from 2.95 ml. of dimethylformamide and 1.45 ml. of phosphorous oxychloride in 10 ml. of methylene chloride. The red solution is stirred for 2 hours at 0° C. and afterwards heated to room temperature within 1 hour. The reaction mixture is cooled once more to approx. 5° C., 10 g. of sodium acetate in portions and 35 ml. of 90% methanol are added and the batch is stirred for 45 minutes at room temperature, diluted with water and worked up with methylene chloride in the usual way. 1.8 g. of the so obtained 6-formyl compound are dissolved in 20 ml. of methanol and stirred for 15 minutes at room temperature after addition of 180 mg. of sodium boric anhydride. The reaction solution is then poured onto 200 ml. ice water and extracted twice with either. The organic phase is washed with water until neutral, dried, and evaporated untid a water-jet vacuum. Then 1.4 g. of the crude reduction production are dissolved in 14 ml. of 66% strength acetic acid and stirred for 5 minutes at room temperature. The reaction mixture is poured onto 250 ml. of ice water, the precipitate that settles out taken up in ether, washed with ice-cold diluted sodium hydrogen carbonate solution and with water until neutral. The washings are extracted with ether, the organic solutions dried with sodiuim sulphate and evaporated under a water-jet vacuum at approx. 25–30° C. bath temperature. The resulting crude 3,20-dioxo-6-methylene-17α-caproyloxy-Δ$^4$-19-nor-pregnene can be subjected to hydrogenation without having been purified.

EXAMPLE 3

2.0 g. of 3,20-dioxo-6α-methyl-17α-hydroxy-Δ$^4$-10-nor-pregnene are suspended in 5 ml. of capronic acid with passage of nitrogen and while stirring, and mixed dropwise within 30 minutes with 2.5 ml. of trifluoroacetananhydride. The reaction mixture is subsequently stirred for a further 4 hours at room temperature, then poured onto approx. 10 g. of ice water, and the mixture subjected to steam distillation in order to separate the excess capronic acid. The non-volatile solid residue is taken up in ether, and the ether solution exhaustively washed with ice-cold diluted sodium hydroxide solution and water. The washings are extracted with ether, the organic solutions dried and evaporated under a water-jet vacuum. The resulting crude product is purified by chromatography on silica gel and subsequent repeated recrystallisation from a methylene chloride-ether-petroleum ether-petroleum ether mixture and yields the 3,20-dioxo-6α-methyl-17α-caproyloxy-Δ$^4$-19-nor-pregnene, which melts at 112° to 115° C. and is identical with the product obtained in Example 1.

The 3,20 - dioxo - 6 - methyl - 17α - hydroxy-Δ$^4$-19-nor-pregnene can be manufactured in the following way:

A solution of 8.6 g. of 3-oxo-5α,17α-dihydroxy-6β-methyl - 20,20-ethylenedioxy-19-nor-pregnene (obtained from 17α-acetoxy-19-nor-progesterone by successive enolacetylation, sodium boric anhydride reduction, hydrolysis of the 17α-acetoxy group, selective acetylation in 3 position, epoxidation of the Δ$^5$-double bond with m-chloroperbenzoic acid and Grignard reaction with methyl magnesium iodide) in 125 ml. of chloroform and 860 ml. of methanol is mixed, while stirring, within 1 minute with 300 ml. of N-sodium hydroxide solution and stirred for 40 minutes at room temperature in atmosphere of nitrogen. The reaction mixture is poured onto water, extracted twice with chloroform, the extracts washed with water until neutral, dried, and evaporated under a water-jet vacuum. The resulting crude product is dissolved in 500 ml. of acetone and 250 ml. of choloform, mixed with 12.5 ml. of a solution prepared by diluting 4.60 ml. of concentrated sulphuric acid to 20 ml. and stirred for 40 minutes at room temperature, then poured onto approx. 2 litres of water and worked up in the usual way. Since the resulting crude product consists largely of the 6β-methyl compound, it is dissolved in chloroform containing hydrochloric acid in order to effect isomerisation, and life to stand for two hours. The working up yields an isomer mixture rich in (over 80%) 3,30-dioxo-6α-methyl-17α-hydroxy-Δ$^4$-19-nor-pregnene that can be subjected to esterification either directly or after crystallisation has first taken place.

EXAMPLE 4

Oily injection solution:

| Ingredients: | Mg. |
|---|---|
| 3,20 - dioxo-6α-methyl-17α-caproyloxy-19-nor-Δ$^4$-pregnene | 100 |
| Benzyl benzoate | 350 |
| Benzyl alcohol | 90 |
| Sesame oil, to make 1.0 ml. | |

The active substance is dissolved in a mixture of benzyl benzoate and benzyl alcohol at 40° C., and the clear solution is stirred and mixed with sufficient sesame oil heated at 40° C. to produce a content of 100.0 mg. of active substance in 1 ml. of solution. The solution is filtered sterile in the usual manner and charged into ampoules under aseptic conditions.

EXAMPLE 5

Oily injection solution:

| Ingredients: | Mg |
|---|---|
| 3,20-dioxo - 6α - methyl - 17α - caproyloxy-19-nor-Δ$^4$-pregnene | 30.0 |
| Benzyl alcohol | 90.0 |
| Sesame oil, to make 1.0 ml. | |

The active substance is dissolved at 40° C. in benzyl alcohol. Sufficient sesame oil heated at 40° C. is stirred into the clear solution to produce a content of 30.0 mg. of active substance per 1 ml. of solution. The solution is filtered sterile in the usual manner and charged into ampoules under aseptic conditions.

EXAMPLE 6

Injection suspension:

| Ingredients: | Mg. |
|---|---|
| 3,20 - dioxo-6α-methyl-17β-caproyloxy-19-nor-Δ⁴-pregnene | 10.0 |
| Sodium carboxymethyl cellulose of medium viscosity | 5.0 |
| Sodium chloride | 7.5 |
| Primary sodium phosphate | 1.5 |
| Secondary sodium phosphate | 1.5 |
| Polyvinylpyrrolidone | 0.5 |
| Sodium ethylmercurithiosalicilate | 0.02 |
| Distilled water, to make 1.0 ml. | |

The sterile microcrystals of the active substance are suspended under aseptic conditions in the previously prepared and sterilized vehicle. The homogeneous suspension is charged under aseptic conditions into the previously heat-sterilized 1 ml. ampoules and closed so that each ml. of suspension contains 10.0 mg. of active substance

EXAMPLE 7

Hormone tablet:

| Ingredients per tablet: | Mg. |
|---|---|
| 3,20 - dioxo-6α-methyl-17β-caproyloxy-19-nor-Δ⁴-pregnene | 5.0 |
| Lactose | 80.0 |
| Aerosil | 7.0 |
| Wheat starch | 46.0 |
| Talcum | 6.3 |
| Magnesium stearate | 0.7 |
| | 145.0 |

First, the active substance is homogeneously mixed with with part of the lactose. This premixture is then mixed with the remaining lactose, the aerosol and part of the starch, moistened with water and in the usual manner granulated and dried.

The remaining starch, the talcum and magnesium stearate are mixed into the drygranulate and the homogeneous mixture is made up in tablets weighing 145.0 mg. each.

EXAMPLE 8

Oily injection solution:

| Ingredients: | Mg. |
|---|---|
| 3,20-dioxo - 6α - methyl - 17α - caproyloxy-19-nor-progesterone | 20.0 |
| Benzyl alcohol | 90.0 |
| Sesame oil, to make 1.0 ml. | |

The active substance is dissolved in the benzyl alcohol at 40° C. and into the clear solution sufficient sesame oil heated at 40° C. is stirred to produce a content of 20.0 mg. of active substance per ml. of solution. The solution is filtered sterile and under aseptic conditions charged into ampoules in the usual manner.

What is claimed is:

1. A pharmaceutical preparation comprising 6α-methyl-17α-caproyloxy-19-nor-progesterone and a pharmaceutical carrier.

References Cited

UNITED STATES PATENTS 3,488,346    1/1970    Dorfman et al. ____ 260—239.55

SHEP K. ROSE, Primary Examiner

U.S. Cl. X.R.

260—397.4